United States Patent
Ewerlöf et al.

(10) Patent No.: US 6,402,880 B1
(45) Date of Patent: Jun. 11, 2002

(54) METHOD OF GLUING TOGETHER FIRST AND SECOND DISC ELEMENTS IN THE MANUFACTURE OF A DVD

(75) Inventors: Göran Ewerlöf; Nils Gawell, both of Lidingö ; Carl Langenskiöld, Djursholm, all of (SE)

(73) Assignee: M2 Engineering AB, Spånga (SE)

( * ) Notice: Subject to any disclaimer, the term of this patent is extended or adjusted under 35 U.S.C. 154(b) by 0 days.

(21) Appl. No.: 09/478,532

(22) Filed: Jan. 6, 2000

(30) Foreign Application Priority Data

Feb. 22, 1999 (SE) ................................................ 9900622

(51) Int. Cl.[7] .............................................. B32B 31/20
(52) U.S. Cl. ......................... 156/295; 156/74; 427/240
(58) Field of Search ............................... 156/74, 272.2, 156/273.7, 275.5, 275.7, 285, 286, 293, 295; 369/286; 428/64.4, 65.2; 118/52; 427/240

(56) References Cited

U.S. PATENT DOCUMENTS

| | | | | |
|---|---|---|---|---|
| 4,877,475 A | * | 10/1989 | Uchida et al. ............ | 156/273.7 |
| 5,954,908 A | * | 9/1999 | Amo et al. .................. | 156/285 |
| 5,989,632 A | * | 11/1999 | Sanada et al. ............... | 427/240 |
| 6,042,684 A | * | 3/2000 | Ohman ........................ | 156/285 |
| 6,179,031 B1 | * | 1/2001 | Rack et al. .................. | 156/538 |

FOREIGN PATENT DOCUMENTS

JP   11053769   * 2/1999

* cited by examiner

Primary Examiner—Michael W. Ball
Assistant Examiner—John T. Haran
(74) Attorney, Agent, or Firm—Jacobson Holman, PLLC

(57) ABSTRACT

A method of bonding together a first disc element (1) and a second disc element (2) with the aid of glue (10) to form a DVD comprises applying a quantity of glue (10) in the form of a ring on the first disc element, said ring being disposed concentrically with a center hole through the first disc element (1), and moving a second disc element, which also has a center hole and which is parallel with the first disc element, towards the glue ring in parallel with said first disc element and with the centre holes of said disc elements in coaxial alignment, such as to enable the glue to spread between the surfaces of the disc elements through the effect of pressure and capillary action. A center peg (14) is inserted sealingly in the centre hole of the first disc element and the glue ring is applied in contact with the perimeter surface of the peg.

19 Claims, 1 Drawing Sheet

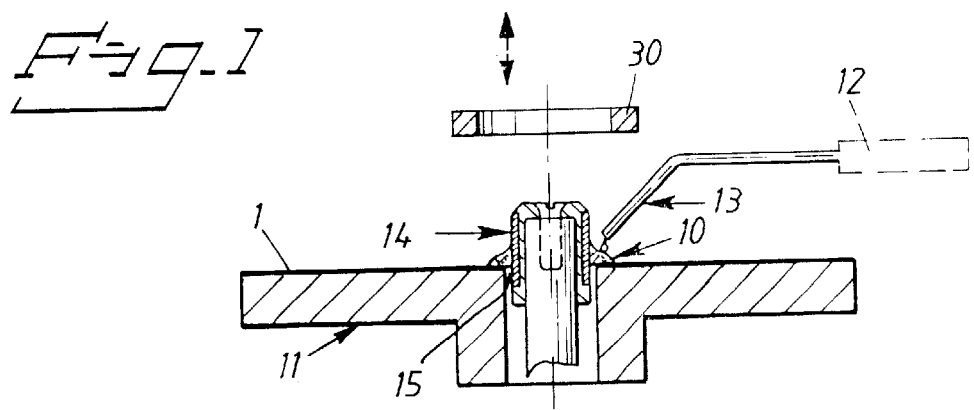
Fig. 1
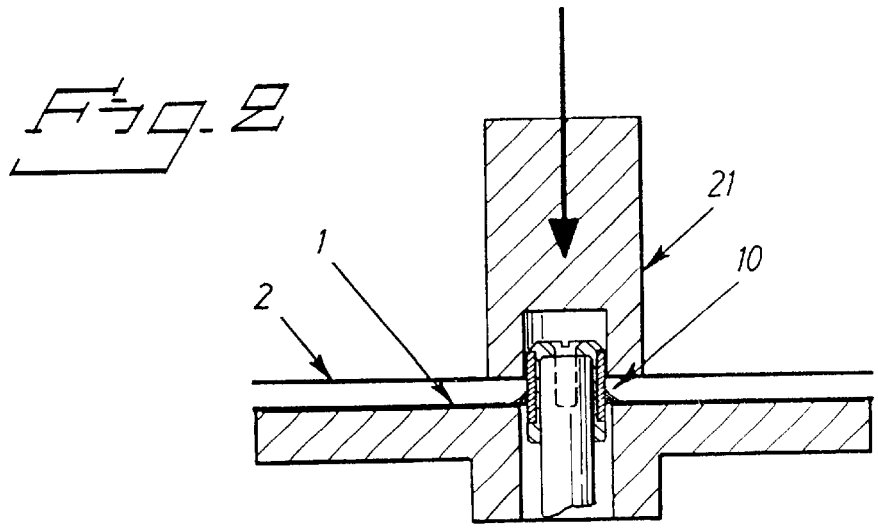
Fig. 2
Fig. 3
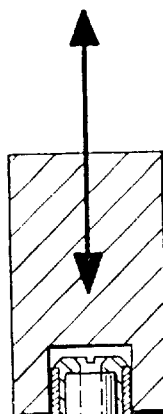
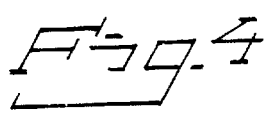
Fig. 4
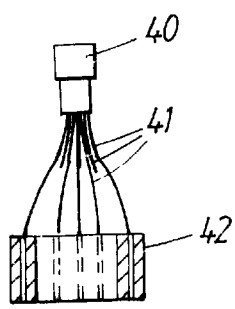

METHOD OF GLUING TOGETHER FIRST AND SECOND DISC ELEMENTS IN THE MANUFACTURE OF A DVD

BACKGROUND OF THE INVENTION

1. Field of the Invention

The present invention relates to a method of gluing together first and second disc elements to form a composite disc wherein a quantity of glue is applied on the first disc element in the form of a ring, the ring being disposed concentrically with a center hole through the first disc element, and wherein a second disc element, which also has a center hole and which is parallel with the first disc element, is moved in parallel with the glue ring during coaxial alignment between the center holes of respective disc elements, such as to enable the glue to be spread between the surfaces of the disc elements as a result of pressure and capillary action.

The present invention relates to a method of gluing together first and second disc elements to form a composite disc of the kind defined in the preamble of claim 1.

2. Description to the Related Art

There are, at present, four different types of DVDs, these being designated DVD5, DVD9, DVD10 and DVD18. All four formats consist of two 0.6 mm disc elements, so-called substrates, which are bonded together with a so-called bonding material, which is most often a transparent UV-cured glue. The bonding material used in the formats DVD9 and DVD18 must be transparent.

The most usual method of bonding the substrates together is to place the bottom substrate on a rotatable table and applying glue to the substrate. A linear flow piston pump delivers a predetermined amount of glue, about 0.5 ml, through a cannula whose tip is placed on a radius of about 30 mm from the centre of the substrate. The substrate is rotated through one or more turns while delivering glue to the substrate at the same time. There is thus provided on the bottom substrate a ring of glue that has an outer diameter of about 60 mm.

The top substrate is then pressed slowly down onto the glue ring, causing the glue to spread between the substrates partly as a result of the pressure exerted and partly through capillary action.

The known technique used in practice thus involves applying a predetermined amount of glue onto a first disc element in the form of a concentric ring, and then displacing a second disc element arranged plane-parallel with the first disc element in parallel with said element so that the glue will spread partly as a result of the pressure applied and partly as a result of capillary action. The glue is preferably applied whilst the first disc element rotates, and the first disc element is preferably orientated horizontally.

The disc elements/the substrates comprise plastic discs that have an information carrying layer, for instance an aluminium layer.

The aforedescribed gluing method is encumbered with serious drawbacks, however, due to the formation of air bubbles in the glue as the top substrate is pressed into contact with the glue on the bottom substrate. This formation of air bubbles is caused by a combination of the surface tension of the glue, the capillary action, and the static electric charge on the substrates, therewith causing uncontrolled jumping of the glue to the top substrate as the substrates come into contact with each other, which results in a foam formation. When the substrates are highly charged, glue particles are liable to jump to the top substrate before contact with the glue has been made.

Although these bubbles have not the same significance in respect of the formats DVD5 and DVD10, they can cause oxidation of the aluminium layer on the disc in certain cases, resulting in disturbances in operation.

On the other hand, it is required that no air bubbles are formed in the glue when producing the formats DVD9 and DVD18, since in the case of these formats the laser reads through the glue coating; even microbubbles will create reading interference.

SUMMARY OF THE INVENTION

The object of the present invention is to endeavor to eliminate the aforesaid drawbacks and to provide a bonding method that will provide a uniform glue film and a glue film that extends right up to the center hole of the substrates and which completely lacks air bubbles.

This object is achieved with the present invention in which, when bonding a first disc element to a second disc element with the aid of glue to form a composite disc, a center peg is sealingly inserted in the center hole of the first disc element, and a glue ring is applied in contact with the peripheral surface of the peg.

An important feature of the invention resides in placing a peg in the centre hole of the first disc element, in sealing contact with the edge of the hole. The glue ring is applied suitably in contact with the peg, so as to enable the greatest thickness of the glue ring to be established in the close proximity of the surface of the peg.

The glue and/or the peg is/are suitably chosen so that the glue can be drawn up along the vertically orientated peg through the medium of surface tension and so that the glue ring will obtain a cross-sectional shape that is generally similar to that of a right angled triangle. The glue ring applied to the first disc element is suitably formed by a predetermined amount of glue, which is distributed uniformly around the disc periphery. After the glue has been spread out, the glue can be cured suitably in the region nearest the centre hole of the disc.

The glue quantity may be applied in the form of a constant glue flow which is deposited around a predetermined circular path that is concentrical to the first disc element; the glue flow is chosen so that the glue will be applied around the first disc element in a full revolution of the disc element or in a number of full revolutions.

A delimiting ring having a circular inner surface may be placed temporarily on the first disc element, the inner surface being coaxial with the disc element, and therewith defining a radially outer spread limit with respect to the glue ring prior to applying the second disc element.

The second disc element may be supported on a horizontal surface of a table that is rotated about a vertical axis. Additionally, the second disc element may be pressed against the glue ring, optionally with the aid of a cylindrical press foot that is applied coaxially to the second disc element.

Furthermore, the second disc element may be first moved toward the first disc element at a relatively high speed until the disc reaches contact with the glue ring; movement of the second disc element toward the first disc element may then be continued, but at a relatively low speed. The first and second disc elements may also be rotated commonly about their respective coaxial axes so as to spread the glue layer radially.

The present invention further includes a method of forming a composite disc from first and second disc elements using a peg in a center hole of the first disc element, characterized by choosing a glue that can be cured by radiation, curing the glue layer spread out between the disc elements by irradiating the layer in the region nearest the peg, and thereafter moving the mutually bonded disc elements with cured glue in the region nearest the center holes of the disc elements to a curing apparatus in which the pair of mutually bonded elements are rotated while being irradiated to finally cure the glue layer.

The present invention further includes a method of forming a composite disc from first and second disc elements using a peg in a center hole of the first disc element, in which the glue ring is applied by delivering to the first disc element a predetermined quantity of glue with the aid of a piston pump set to a given glue flow, via an outlet passageway which opens towards the peg through a stationary outlet opening, while rotating the first disc element at a speed which is synchronized to the pump flow so that the glue string will be deposited through one or more complete revolutions of the disc element and form a glue ring with the glue distributed uniformly around the perimeter of the element.

The present invention may further be characterized by choosing the exposed material on the peripheral surface of the peg so that the glue ring will have its greatest thickness in the longitudinal direction of the peg and adjacent the perimeter surface of the peg. In addition, at least a part of the outer surface of the peg may be comprised of a springy, pliant material so as to seal against the edges of the center hole, the outer surface of the peg being adapted to sealingly bridge the edges of the center holes.

BRIEF DESCRIPTION OF THE DRAWINGS

The invention will now be described in more detail with reference to the accompanying drawing.

FIG. 1 illustrates a bottom substrate and glue delivery devices.

FIG. 2 shows the bottom substrate with glue applied thereto, and also shows a top substrate at the very moment of commencing the bonding process; and FIG. 3 illustrates the situation at the end of the process.

FIG. 4 illustrates a UV-irradiating device.

DETAILED DESCRIPTION OF THE PREFERRED EMBODIMENTS, and after

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The novel method will be described with reference to bonding together and curing two 0.6 mm DVD-substrates.

In the FIG. 1 embodiment, a flexible centre peg 14 having a vertical extension of about 15 mm is placed in the centre hole of a rotatable table 11. The bottom substrate 1 is pressed down on the centre peg into abutment with the table 11; the peg 14 therewith seals against the edge of the substrate centre hole. The peg 14 is shown to consist of a rigid core and an elastomeric mantle layer whose surface seals against the edge of the centre hole of the disc substrate. A predetermined amount of glue is delivered through a cannula 13 connected to a piston pump 12 and opening onto the flexible centre peg 14; the table 11 carrying the bottom substrate 1 is rotated at the same time, at a speed of about 100 rpm and in synchronism with the flow from the piston pump 12. The piston pump is suitably of the type that delivers a linear flow, meaning that glue will flow through the glue-applying cannula at the same rate of flow from start to finish, i.e. up to the time when all of the predetermined amount of glue has been dispensed onto the substrate. The pump motor is suitably adjusted to an appropriate speed prior to dispensing the glue and the motor speed then held constant. The rotational speed of the table is trimmed, so that the flow of glue will start and stop at one or more complete revolutions. The glue can be applied as the table rotates through one full revolution, or through two full revolutions, and so on. This results in uniform application of the glue around the disc. The glue will thus form a uniform ring that surrounds the centre peg in the centre of the substrate and that has an outer diameter of about 25 mm, for instance.

Prior to applying the glue, a steel ring 30 (hatched in FIG. 1) can be placed temporarily on the bottom substrate 1 coaxially with the flexible centre peg 14, said ring 30 rotating together with the table and the bottom substrate whilst the predetermined amount of glue is being delivered to the flexible centre peg 14. The steel ring functions to form the glue into a perfectly circular ring that has an outer diameter of about 25 mm around the peg 14, whereafter the ring is lifted away from the substrate. Due to the surface tension of the glue, the glue is drawn partially up along the peg 14 in a wedge-like formation, so that the greatest thickness of the glue ring perpendicular to the surface of the substrate will lie adjacent the peg.

Subsequent to having formed a glue ring 10 on the bottom substrate 1, the top substrate 2 and a circular press foot 21 are placed on the bottom substrate 1 coaxially therewith, as shown in FIG. 2. The press foot 21 is moved vertically down towards the top substrate 2 initially at a relatively high speed, until the top substrate comes into contact with the underlying glue ring 10, and thereafter at a relatively slow speed as the glue spreads between the two substrates as a result of the pressure exerted and the capillary action.

Thus, in bonding the substrates together the top substrate 2 is pressed slowly down over the flexible centre peg 14 with the aid of the press foot 21, wherewith the substrate first meets the glue ring close to the centre peg and then successively contacts the remainder of the glue. The substrates are centrifuged to expedite spreading of the glue up to the periphery of the combined disc, and also to influence the thickness of the glue film.

The capillary action occurring between glue and the top substrate as they come into contact decreases due to the wedge formation of the glue around the peg 14. This enables the effect of the capillary action of the glue to be controlled by varying the speed at which the top substrate is pressed into contact with the bottom substrate. Because the substrate and glue contacting process can be controlled, the problem associated with the formation of air bubbles no longer exists. When the top substrate has come into contact with the glue and the bottom substrate, the glue forms an expanding ring between the substrates. This means that the glue will be uniformly distributed between the substrates as they are pressed together. The glue functions such as a conductor of electricity, so that if the composite disc should be charged with static electricity, the charged state of the disc will be neutralised through the glue. The glue is able to conduct an electric charge to earth via the peg.

The press foot 21 is comprised of an adjustable steel sleeve of about 30 mm in diameter. In a substrate pressing operation, the press foot moves vertically downwards and presses the top substrate in total parallelity with the bottom substrate. As the press foot moves down, the substrates come into mechanical contact with each other at the centre, meaning that the glue is pressed immediately outwards from the centre peg to the periphery, to a diameter of about 60 mm. This accelerates the process and reduces machine cycle time.

FIG. 3 illustrates the situation at the end of the pressing operation, at a stage when the press foot 21 shall be moved straight up and away from the composite disc.

Subsequent to pressing the substrates together, the glue is cured around the centre peg 14 with the aid of UV-light delivered from a central UV-lamp 40 through a plurality of light conductors 41 mounted in an annular holder 42 (FIG. 4) placed around the peg 14. This central curing process enables the glue to be applied so as to cover the whole surface between the substrates right into the centre hole, without the glue leaking out at the centre. The composite disc can also be handled without the substrates sliding in relation to each other as the disc is transported to a final curing process. The surface finish of the centre hole is improved by virtue of the centre peg functioning as a mould for the bonding material, which then fills out those surface irregularities that may have been formed as the centre hole is punched in the substrates. The disc will also be stronger around the centre hole.

The flexible centre peg is withdrawn from the disc when the centre curing process and centrifugation have been completed, whereafter the disc is finally cured during rotation in a UV-drier (not shown).

The glue is applied so that it fills the angle defined between the peg and the first substrate, wherewith the glue ring is preferably applied so that its greatest thickness will be located immediately adjacent the peg. The peg may include a flexible, elastomeric outer layer or covering and a stable core, or may consist entirely of a springy, pliant material that will be enable the peg to engage or seal against the edges of the holes in respective disc elements, even when the edge surfaces are not smooth, and which will enable the peg to be pushed into/withdrawn from said holes without damaging the edges or edges of said holes. The peg centres the substrates relative to one another and also relative to the table.

The glue and the mantle surface of the peg are suitably chosen so that the glue will be drawn up along the peg by surface tension action, so that the glue string will have its greatest thickness in the proximity of the peg.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method of bonding a first disc element to a second disc element with the aid of glue to form a composite disc, comprising inserting a center peg sealingly in a center hole of the first disc element, applying a quantity of glue from a dispenser on the first disc element in the form of a ring in contact with a peripheral surface of the peg, the ring being disposed concentrically with said center hole through said first disc element, and moving a second disc element, which also has a center hole and which is parallel with the first disc element, in parallel with the first disc element during coaxial alignment between the center holes of said disc elements such as to enable the glue to be spread between the surfaces of the disc elements as a result of pressure and capillary action.

2. The method according to claim 1, and further comprising the step of predetermining the quantity of glue applied and distributing said glue evenly around the first disc element.

3. The method according to claim 2, wherein said glue quantity is applied in the form of a constant glue flow which is deposited around a predetermined circular path that is concentric with the first disc element, and said glue flow is selected so that the glue is applied around the first disc element in at least one full revolution of the first disc element.

4. The method according to claim 1, and further comprising the step of placing temporarily on the first disc element a delimiting ring having a circular inner surface such that said inner surface is coaxial with the first disc element and defines a radially outer spread limit with respect to the glue ring prior to applying the second disc element.

5. The method according to claim 1, wherein the first disc element is supported on a horizontal surface of a table that is rotated about a vertical axis.

6. The method according to claim 1, wherein the second disc element is pressed against the glue ring using a cylindrical press foot that is applied coaxially to the second disc element.

7. The method according to claim 6, wherein the step of moving includes first moving the second disc element towards the first disc element at a first speed until said second disc element reaches contact with the glue ring, and then continuing movement of said second disc element towards said first disc element but at a second speed, said second speed being slower than said first speed.

8. The method according to claim 7, and further comprising the step of rotating the first and the second disc elements commonly about their respective coaxial axes so as to spread the glue layer radially.

9. The method according to claim 1, and further comprising choosing a glue that can be cured by radiation, curing the glue layer spread out between said disc elements by irradiating said layer in a region nearest the peg, and thereafter moving the mutually bonded disc elements with cured glue in the region nearest the center holes of said disc elements to a curing apparatus in which the mutually bonded elements are rotated while being irradiated to finally cure the glue layer.

10. The method according to claim 1, wherein the dispenser is a piston pump and said glue ring is applied by delivering to the first disc element a predetermined quantity of glue using said piston pump set to a given glue flow, via an outlet passageway which opens towards the peg through a stationary outlet opening, whilst rotating the first disc element at a speed which is synchronized to the flow from said piston pump, so that the glue ring will be deposited through at least one complete revolution of said first disc element and form a glue ring with the glue distributed uniformly around the perimeter of said first disc element adjacent said peg.

11. The method according to claim 1, wherein said peripheral surface of the peg draws the glue by capillary action so that the glue ring has a greatest thickness in the longitudinal direction of the peg and adjacent the peripheral surface of the peg.

12. The method according to claim 1, wherein at least a part of an outer surface of the peg is comprised of a springy, pliant material so as to seal against edges of the center hole of said first disc element, the outer surface of the peg being adapted to sealingly bridge the edges of said center holes of said first and second disc elements.

13. A method of bonding a first disc element to a second disc element with glue to form a composite disc, comprising the steps of:

inserting a center peg sealingly in a center hole of the first disc element;

dispensing a quantity of glue directly onto the first disc element substantially in the form of a ring and in contact with a peripheral surface of the peg; and moving a second disc element, which also has a center hole and which is parallel with the first disc element, in parallel with the first disc element during coaxial alignment between the center holes of said disc elements to enable the glue to be spread between the surfaces of the disc elements as a result of pressure and capillary action.

14. The method according to claim 13, wherein the step of dispensing is performed using a piston pump and said glue ring is applied by delivering a predetermined quantity of glue to the first disc element using said piston pump set to a given glue flow, while rotating the first disc element at a speed which is synchronized to the flow from said piston pump.

15. The method according to claim 14, wherein said glue quantity is applied in the form of a constant glue flow which is deposited around a predetermined circular path that is concentric with the first disc element, and said glue flow is selected so that the glue is applied around the first disc element in at least one full revolution of the first disc element.

16. The method according to claim 13, and further comprising the step of placing temporarily on the first disc element a delimiting ring having a circular inner surface such that said inner surface is coaxial with the first disc element and defines a radially outer spread limit with respect to the glue ring prior to applying the second disc elements.

17. The method according to claim 13, wherein said peripheral surface of the peg draws the glue by capillary action so that the glue ring has a greatest thickness in the longitudinal direction of the peg and adjacent the peripheral surface of the peg.

18. The method according to claim 17, wherein in the step of moving said second disc element is pressed down over said peg using a press foot, said second disc element first meeting said glue ring close to said peg and then successively contacting a remainder of said glue ring.

19. The method according to claim 18, wherein the step of moving includes first moving the second disc element towards the first disc element at a first speed until said second disc element reaches contact with said glue ring close to said peg, and then continuing movement of said second disc element towards said first disc element but at a second speed, said second speed being slower than said first speed.

\* \* \* \* \*